April 10, 1956 R. FUTTERKNECHT 2,741,707
IONIZATION-MEASURING INSTRUMENT
Filed May 20, 1953 2 Sheets-Sheet 1
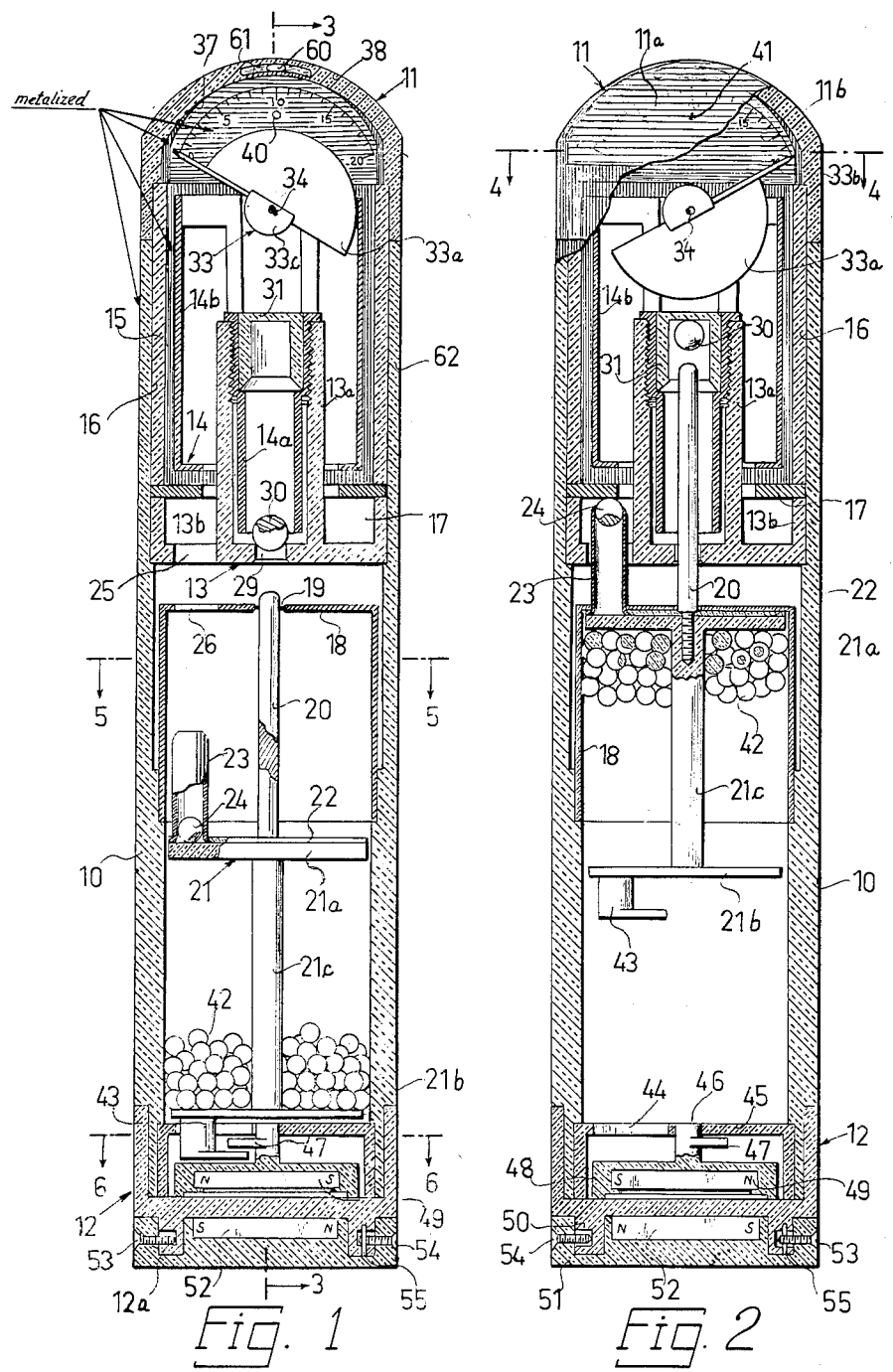
INVENTOR:
RUDOLF FUTTERKNECHT
BY Karl F. Ross
AGENT April 10, 1956 — R. FUTTERKNECHT — 2,741,707
IONIZATION-MEASURING INSTRUMENT
Filed May 20, 1953

INVENTOR:
RUDOLF FUTTERKNECHT
BY Karl F. Ross
AGENT

United States Patent Office 2,741,707
Patented Apr. 10, 1956

2,741,707
IONIZATION-MEASURING INSTRUMENT

Rudolf Futterknecht, Stuttgart-Wangen, Germany, assignor to Nassau Distributing Co., Inc., New York, N. Y., a corporation of New York Application May 20, 1953, Serial No. 356,278
19 Claims. (Cl. 250—83.6)

My present invention relates to an ionization-measuring instrument of the type disclosed in my co-pending application Ser. No. 241,620, filed August 13, 1951, now Patent No. 2,646,516, issued July 21, 1953.

In said application I have described and shown a portable device designed to detect the presence of radiation wherein a charge generator, comprising a set of dielectric pellets movable within a housing made partly of insulating material, serves to charge an indicating device such as an electrometer by establishing intermittent contact with the electrodes thereof; shaking or inverting the housing serves to impart a frictional charge to the pellets and to complete the connection to the indicator.

The general object of my present invention is to provide an improved, simple, weather-independent and inexpensive device of the aforedescribed character having means for positively excluding various sources of error, thereby insuring accurate readings and enabling radiation measurements to be carried out over extended period and/or a considerable length of time after charging.

More particular objects within the framework of the foregoing include:

To provide means for accumulating successive charges produced by the generator and for storing a charge representing a multiple of the generator output;

To provide improved indicator means readily readable with the naked eye and affording a relatively wide scale spread, with linear calibration, without necessitating an undue increase in the dimensions of the ionization chamber forming part of the indicator, thus insuring the presence of an adequate field strength across said chamber;

To provide a hermetically sealed housing to guard against the entrance of moisture and other agents capable of falsifying the reading, in combination with externally operable locking means for preventing untimely contact between the generator and the indicator electrodes in any position of the instrument;

To provide auxiliary sighting means designed to avoid parallactic errors in the reading of the indicator;

To provide a charge-storing condenser distinct from the generator and normally disconnected therefrom but permanently connected to the indicator means, thereby insuring a concentration of the charge at or near the indicator electrodes and minimizing the danger of leakage, the condenser preferably comprising air-spaced plates so as to avoid a lagging response due to the delayed manifestation of radiation-induced changes in the interior of a solid dielectric; and To provide a charge transfer mechanism between the generator and the condenser for establishing a temporary connection therebetween, preferably with the aid of a contactor also serving as a guide rod for the mechanism.

The above and other objects of my instant invention will become apparent from the following description of a now preferred embodiment, reference being had to the accompanying drawing in which:

Fig. 1 is a sectional elevation of an ionization-measuring instrument according to the invention, shown in charged condition;

Fig. 2 is a view similar to Fig. 1 but showing the instrument in discharged condition immediately prior to charging, the internal parts thereof being illustrated in a position they would assume during shaking and/or inversion of the instrument;

Figure 5:
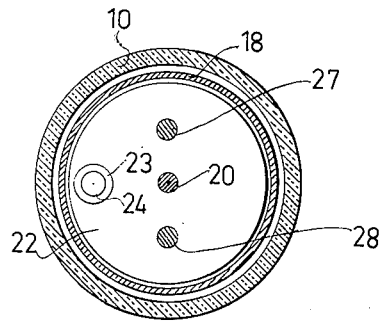
Figure 6:
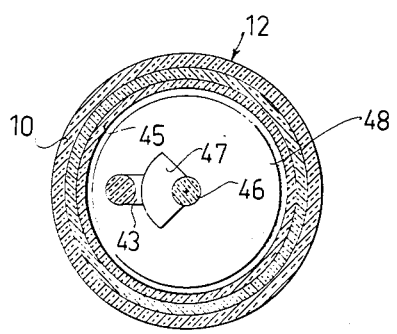

Figs. 5 and 6 are cross-sections taken on the lines 5—5 and 6—6, respectively, of Fig. 1.

The instrument shown in the drawing comprises a housing composed of a tubular central body 10 of insulating material, a cap 11 of similar but highly transparent material, and a base 12 of insulating material. Rigidly held within the suitably recessed tubular body 10 is an insulating insert 13 forming a tube 13a and a flange 13b resting against the housing wall. An inner electrode 14 comprises a depending tubular portion 14a, screwed into the tube 13a, and a concentric outer cylinder 14b constituting one of the plates of a charging condenser. The other condenser plate is constituted by the metal coating 15 of a plastic sleeve 16 inserted in the housing body 10 above the flange 13b and separated therefrom by a metallic disk 17 with which it is in conductive contact. The housing portion 10, the insert 13 and other insulating elements adjacent the charging condenser 14b, 15 preferably consist of a synthetic material having a dielectric constant near unity, e. g. polystyrene. The air space between the condenser plates constitutes part of an ionization chamber extending into the cap 11.

Press-fitted inside the housing portion 10 below the insert 13 is an inverted metal cup 18 having a central hole 19 traversed by a metallic guide rod 20. The lower end of rod 20 is screwed into a dielectric slide member or piston 21 consisting of an upper and a lower disk 21a, 21b interconnected by a central rod 21c. A metal plate 22 is secured to the top surface of upper disk 21a and carries an upwardly extending metal nipple 23 enclosing a metal ball 24. Flange portion 13b of member 13 and cup 18 are provided with eccentric apertures 25, 26 adapted to clear the nipple 23 when the piston 21 is displaced, by gravity or inertia upon a tilting or a shaking of the instrument, into the hollow of the cup as shown in Fig. 2. It will be noted that under these circumstances the ball 24 projects sufficiently above the constricted neck of nipple 23 to contact the metal disk 17. A pair of guide rods 27, 28, projecting downwardly from the closed top of cup 18, pass through corresponding apertures in plate 22 and disk 21a to maintain the piston 21 in a fixed angular position relative to the instrument housing.

The flange portion 13b is also provided with a central opening 29 accommodating the rod 20 when the piston occupies the position of Fig. 2; overlying this opening is a metal ball 30 adapted to be received in an insulating thimble 31 which is gripped by the electrode tube 13a. The electrode 14 is slitted at 32, immediately above the thimble 31, to form a clearance for the mounting of an indicating member 33 whose segmental body 33a carries a pointer 33b and a reinforced hub portion 33c; the segment 33a is a thin metal foil to which the pointer 33b is fastened, e. g. by pasting, in the form of a distinctly colored plastic or cellulosic strip.

The indicating member 33 is so balanced on a pin 34 that the pointer will normally, i. e. with the instrument uncharged and held upright, occupy the position shown in Fig. 2. The pin 34, spanning the gap 32 and journaled in bearings 35, 36 within the electrode 14, as well as the segment 33a are conductive extensions of the central electrode 14. A suitable plumb or level, here shown as an air bubble 60 formed by a liquid 61 in a cavity of the cap 11, serves to indicate at a glance the vertical position of the instrument.

The metallic coating 15, forming the outer plate of the charging condenser, is electrically extended by making contact with a similar metallic layer 37 on the interior of transparent cap 11; this layer is only of approximately molecular thickness along the inner surfaces of a pair of vertical walls 11a, 11b of this cap, so as not materially to decrease the light-transmissivity of these walls which thus form a pair of windows through which the pointer 33b can be viewed. The rear window 11b (as viewed in Figs. 1, 2) carries a scale 38 cooperating with the pointer 33b; it will be noted that, for reasons subsequently to become apparent, the high point of the scale (shown calibrated, by way of example, at 20) coincides with the normal position of the pointer illustrated in Fig. 2. A metallic layer 62, reduced again to molecular thickness at the windows 11a, 11b, coats the outside of the instrument to prevent the accumulation of stray charges.

Figure 4:
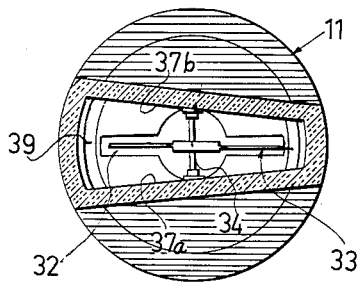
Fig. 4 is a cross-section taken on the line 4—4 of Fig. 2.

The window-forming walls 11a, 11b of the cap 11 are not parallel but converge to form a wedge-shaped space 39 representing an extension of the aforementioned ionization chamber, as best seen in Fig. 4. It will be understood that the conductive molecular layers 37a, 37b lining this chamber constitute the fixed electrode of an electrometer whose movable counter-electrode is constituted by the segment 33a. The configuration of this segment and the angle of convergence of the walls 11a, 11b are so selected as to afford a linear calibration for the scale 38; the mean spacing of these walls is made close enough to result in a sufficiently high field strength across the chamber 39 to insure the necessary sensitivity when the instrument is charged in the manner hereinafter described. A small circle 40 on the window 11b and a dot 41 on window 11a serve as a sighting aid for aligning the instrument with the observer's eye and avoiding parallactic errors in reading the indicator.

Encased between the disks 21a, 21b of piston 21 are a number of pellets 42, preferably of quartz glass, adapted to be charged positively by friction on the plastic housing wall 10. The quantity and the size of these pellets are so selected as to provide an overall storage capacity for positive charges equal to or somewhat greater than the saturation capacity for negative charges of the dielectric wall 10 below the cup 18. It will be understood that there exists, for an instrument housing of given dimensions and of a specified dielectric material (e. g. polystyrene), a readily determinable saturation limit beyond which there will be no transfer of electrons from the glass pellets to the housing; for greatest efficiency, therefore, the glass pellets should be numerous enough to furnish the saturation number of electrons in a single charging operation (tilting or shaking), no appreciable benefit resulting from a substantial increase in the number of pellets above the saturation minimum.

Secured to the underside of lower piston disk 21b is a lug 43 adapted to pass through a slot 44 in a dielectric socket member 45 which is press-fitted in the lower end of housing portion 10. A stud 46, bearing a sector-shaped latch member 47, is journaled in the socket 45 and is rigid with a movable disk 48 molded around a permanent bar magnet 49, the disk 48 with its magnet 49 being enclosed within the space between base 12 and socket 45. The base 12 has a depending flange 12a provided externally with an annular groove 50; a control knob 51 is molded around a bar magnet 52 and has a peripheral portion surrounding the flange 12a, this portion having a pair of bolts 53, 54 projecting into the groove 50 to hold the knob 51 in place. A stop pin 55, imbedded in flange 12a and extending across the groove 50, forms an abutment for the bolt 53 or for the bolt 54 to define, respectively, a charging position in which the piston 21 is free to move within the housing, as shown in Fig. 2, and a reading position in which the piston is locked in its bottom position by engagement of the latch 47 with the lug 43, as seen in Figs. 1 and 6. The joints between housing members 10, 11 and 12 are sealed in air-tight manner by a suitable adhesive.

The provision of a gravity-controlled indicator 33, as hereinabove described, dispenses with the need for temperature-sensitive restoring means such as hair springs or the like. It will be understood, however, that a gravity-independent, balanced indicator, restored to a normal position by resilient forces in a manner known per se, may be used in lieu thereof if such temperature independence is not required.

The operation of my device is as follows:

Before the instrument can be charged, the locking mechanism 43, 47 must be released by rotating the knob 51 into the position shown in Fig. 2, thereby causing outer magnet 52 to move inner magnet 49 into a position in which the latch member 47 will disengage the lug 43 on piston 21. When the instrument is now shaken or rapidly inverted, the parts thereof will momentarily assume the position of Fig. 2 in which the now frictionally charged pellets 42 rest against the cup 18 whose closed end, in turn, is in contact with metal plate 22, a connection being at the same time established from the latter plate by way of nipple 23 and ball 24 to the disk 17 and, thence, to the conductive layers 15 and 37 near the top of the instrument. The condenser layer 15 is thereby charged positively and a corresponding amount of negative charge is induced in plate 22 and cup 18. It should be noted that the metal ball 30, whose mobility is considerably greater than that of the moving system 20—24, has preceded the rod 20 into the thimble 31 so that no contact will have been established between this rod and the inner electrode 13.

Figure 3:
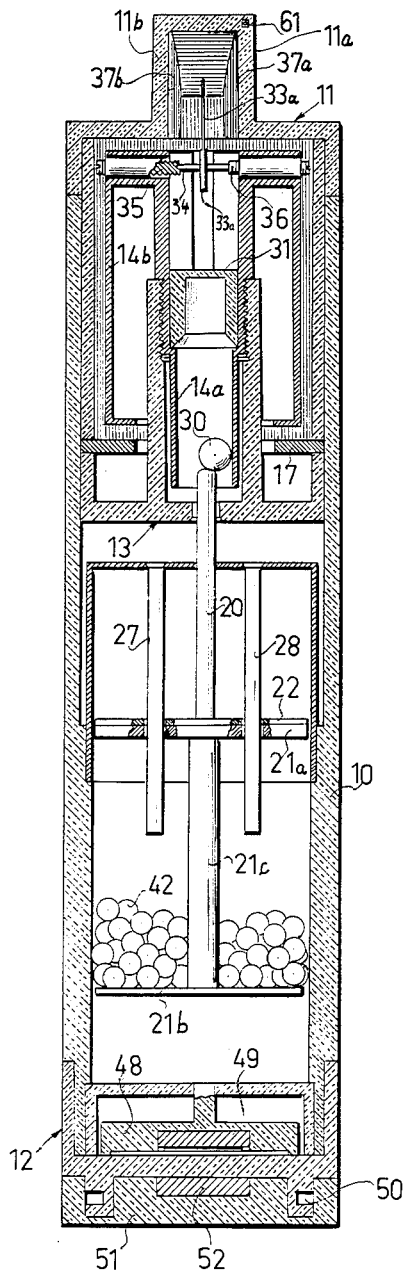
Fig. 3 is a section taken on the line 3—3 of Fig. 1 and showing the parts of the instrument in a position they would occupy, during a charging operation, immediately after passing through the stage depicted in Fig. 2.

When the instrument is again righted (or shaken in the other direction), the ball 30 will leave the thimble 31 and will overtake the rod 20 to establish contact between it and the tubular electrode portion 14a, as shown in Fig. 3, but not before the ball 24 has broken contact with the disk 17. When this occurs, the electrons trapped on the plate 22 will be able to travel toward the condenser electrode 14b to which they will have been attracted by the positive charge now stored on the layer 15. In order to allow this charging operation to proceed most efficiently it is necessary that the following conditions be met:

(a) The pellets 42 should be positioned close to the disk 21a at the time a connection takes place between the plate 15 and the cup 18, so as to draw a maximum number of electrons from that plate; and (b) The pellets should be positioned close to the disk 21b at the time a contact is established between rod 20 and tube 14a by means of ball 30, so as to exert a minimum of attraction upon the electrons on the plate 22.

I have found, in practice, that the above-described conditions will best be satisfied by a charging operation involving energetic shaking of the instrument, preferably in a horizontal position, yet that relatively slow inversions or tilting of the device will somewhat disrupt the sequence described so as to produce a partial discharge. This characteristic is desirable in that it enables the correction of overcharges if the maximum should have been exceeded, as will be more fully apparent from the following.

In order to analyse the operation of my device, it will be helpful to distinguish between a storage capacitance $C'$ (between condenser plates 15 and 14b) and a charging capacitance $C''$ (between cup 18 and condenser plate 15). We may assume that during each charging operation (shaking stroke or inversion) a constant charge $Q=EC$, corresponding to the aforementioned saturation charge of the pellets, is induced in the cup 18, E being the potential difference between the cup and the pellets, and C being the storage capacity of the latter. When a connection is established by the ball 30 between the rod 20 and the electrode 14, the same voltage will be present across the electrodes 15, 14b of the storage condenser and across the electrodes 15, 18 of the charging condenser, hence charges $q'$, $q''$ will be distributed thereon according to the reciprocal of their respective capacitances. When the connection is broken, a residual charge $q''=q'C''/C'$ will thus be retained on the cup 18 and on the plate 22 which has remained electrically connected to the cup by the rod 20 sliding in the narrow aperture 19. Accordingly, the charge $q_1'$ transferred to the storage condenser during the first charging step will be equal to $Q-q_1''=QC'/(C'+C'')=KQ(K<1)$. The total charge available during a second charging step, after the residual charge $q_1''$ has been dissipated by contact between ball 24 and disk 17, will be $Q+q_1'=q_2'+q_2''$, whence $q_2'=K(Q+q_1')=KQ(K+1)$, and for $n$ charging steps $q_n'=KQ(K^{n-1}+K^{n-2}+ \ldots +K+1)$ which for $n$ approaching infinity converges at a limiting value of $Q'=QK/(1-K)=QC'/C''$. Whereas, therefore, with appropriate dimensioning of the aforementioned capacitances an ultimate charge $Q'$ representing any desired multiple of the pellet saturation charge $Q$ may be reached, it will be apparent that a smaller ratio of $C'/C''$ will cause the series to converge more rapidly, whereby a substantially invariable maximum charge $Q'$ will be reached already after a relatively small number of charging operations. When this occurs, the pointer 33b will indicate "0" as in Fig. 1. With a large ratio of $C'/C''$, on the other hand, it will be desirable so to calibrate the scale 38 that the pointer will reach "0" after a finite number of charging operations, any overcharge being remediable in the manner previously described.

It will thus be seen that I have provided an instrument for the purpose set forth wherein the generation, amplification and accumulation of electric charges is carried out solely by gravity and/or inertia, and that magnetic forces requiring no physical penetration of the instrument housing are employed to lock the instrument in a non-charging position in which no amount of shaking or tilting will affect the stored charge and in which, therefore, the device can be carried ready for instantaneous consultation in the pocket of the user. Thus, a person required to stay in a radiation-infested area for an extended period may take readings from time to time in order to ascertain the dosage absorbed by the instrument and, therefore, by his body, thereby to determine the length of time it will be safe for him to remain exposed. Since the progressive discharge of the storage condenser 15, 14b and, therefore, the deflection of the pointer 33b from the zero point of the scale 38 will be a measure of the quantity of radiation absorbed, the scale can be calibrated directly in Roentgens; thus the maximum indiacted by the fully discharged instrument, in the example illustrated, will be 20 R. It will be understood, however, that different measuring ranges will be desirable for different uses; thus, a relatively small range of not more than a few Roentgens will be satisfactory in the case of persons entering a contaminated area and wishing to determine the intensity of radiation present. If, after charging and counting ten seconds, the user notes a deflection of 0.4 R., and if a human tolerance of 36 R. is assumed, then the reading represents a radiation intensity of 2.4 Roentgens per minute, or 144 Roentgens per hour, indicating a safe exposure time of not more than fifteen minutes in this particular instance. For the purpose of such measurements, of course, the scale can also be calibrated in units of time.

Departures from the structural arrangement described and illustrated are possible within the teachings of the present invention and without exceeding the scope of the appended claims.

I claim:

1. An ionization-measuring instrument comprising a pair of electrodes defining an ionization chamber, voltage indicator means connected across said electrodes, generator means adapted to impress a charge upon said electrodes, said generator means including a container having a conductive section and a dielectric section, charge-carrying means in said container and piston means in said container adapted to displace said charge-carrying means between said sections, and circuit means for establishing a connection between said generator means and said electrodes, said circuit means including contactor means carried by said piston means and intermittently engageable with one of said electrodes during movement of said piston means.

2. An instrument according to claim 1, comprising a housing wholly enclosing said electrodes and said generator means, said piston means being displaceable within said container by gravity and inertia only.

3. An instrument according to claim 2, comprising latch means inside said housing adapted to immobilize said piston means, control means outside said housing for operating and releasing said latch means, and magnetic coupling means between said latch means and said control means.

4. An instrument according to claim 3 wherein said latch means is arranged to engage said piston means in a non-charging position in which said contactor means is disconnected from said electrodes.

5. An instrument according to claim 1 wherein said piston means is provided with a pair of axially spaced disks slidable in said container, said charge-carrying means comprising a set of pellets of dielectric material encased between said disks, said pellets having a storage capacity at least equal to the saturation charge of said dielectric section.

6. An instrument according to claim 1 wherein said contactor means comprises a member bridging said conductive section and said one of said electrodes in an extreme position of said piston means.

7. An instrument according to claim 6 wherein said piston means is provided with a first and a second disk of insulating material axially spaced by a distance greater than the length of said conductive section, said first disk being received in said conductive section in said extreme position of said piston means, said charge-carrying means comprising a set of pellets of dielectric material encased between said disks and movable with respect thereto, said member including a metallic element more mobile than said piston means and mounted on said first disk for limited relative displacement in the direction of travel of said piston means, said one of said electrodes being provided with an electrical extension engageable by said element upon said piston means reaching said extreme position and becoming disengaged from said element at the start of the return movement of said piston means.

8. An instrument according to claim 7 wherein said first disk is provided with a metallic portion in conductive contact with said member and with said conductive section over at least a portion of the travel of said piston means including the said extreme position thereof.

9. An instrument according to claim 8 wherein said conductive portion is provided with an elongated extension positioned for momentary electrical contact with the other of said electrodes during said return movement of said piston means, following disengagement of said element from said one of said electrodes.

10. An instrument according to claim 9 wherein said other of said electrodes has a tubular portion adapted to receive said elongated extension, said circuit means further including a metallic contact piece inside said tubular portion adapted to bridge said tubular portion and said elongated extension during part of said return movement.

11. An instrument according to claim 10 wherein said tubular portion is provided with a non-conductive insert, said contact piece comprising a ball receivable in said insert in said extreme position of said piston means.

12. An instrument according to claim 1 wherein said electrodes comprise a pair of concentric, air-speed, cylindrical plates forming a condenser, the capacitance of said condenser being greater than that of a condenser constituted by said conductive section and either of said plates.

13. An instrument according to claim 12, comprising a dielectric housing enclosing said electrodes and said generator means, the outer one of said condenser plates comprising a metallic coating on the interior of said housing.

14. An instrument according to claim 13 wherein said housing is provided with a transparent portion forming a window for the observation of said indicator means, said coating extending over said portion and forming a layer of substantially molecular thickness thereon.

15. An instrument according to claim 14 wherein said indicator means comprises an electrometer including a movable electrode electrically connected to the inner one of said condenser plates and positioned adjacent said molecular layer for movement relative thereto.

16. An instrument according to claim 15 wherein said transparent housing portion forms a pair of converging walls on opposite sides of the path of movement of said movable electrode, each of said walls being coated with said molecular layer.

17. An instrument according to claim 16 wherein said movable electrode and one of said walls carry a pointer and a scale, respectively, said walls being provided with sighting means comprising aligned markings thereon for correctly observing the relative position of said pointer and said scale.

18. In an ionization-measuring instrument, in combination, charge-generating means including a source of cyclically varying potential, indicator means including a pair of electrodes, and mechanism for alternately connecting said electrodes to said source at different stages of an operating cycle of said charge-generating means, said mechanism including a movable, at least partly conductive piston synchronized with said charge-generating means and contactor means adapted to interconnect said piston and a respective one of said electrodes in different positions of said piston.

19. In an ionization-measuring instrument, in combination, a hermetically sealed housing, charge-generating means inside said housing comprising a piston displaceable by inertia, latch means inside said housing adapted to immobilize said piston in a predetermined position, control means outside said housing for operating and releasing said latch means, and magnetic coupling means between said latch means and said control means.

References Cited in the file of this patent

UNITED STATES PATENTS

| 1,855,669 | Glasser et al. | Apr. 26, 1932 |
| 2,459,555 | Tossas | Jan. 18, 1949 |

FOREIGN PATENTS

| 169,918 | Great Britain | Oct. 13, 1921 |
| 395,067 | France | Dec 17, 1908 |